(12) United States Patent
Egawa

(10) Patent No.: US 7,686,456 B2
(45) Date of Patent: Mar. 30, 2010

(54) IMAGE DISPLAY APPARATUS AND METHOD

(75) Inventor: Akira Egawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 216 days.

(21) Appl. No.: 12/069,202

(22) Filed: Feb. 9, 2008

(65) Prior Publication Data

US 2008/0191641 A1 Aug. 14, 2008

(30) Foreign Application Priority Data

Feb. 14, 2007 (JP) ............................ 2007-033118

(51) Int. Cl.
*H05B 37/00* (2006.01)
(52) U.S. Cl. .......................................... 353/85; 353/84
(58) Field of Classification Search .................. 353/85, 353/86, 87, 31, 94, 84, 99, 20, 38, 121, 122; 345/4, 55, 207
See application file for complete search history.

(56) References Cited

U.S. PATENT DOCUMENTS

| | | | |
|---|---|---|---|
| 6,817,717 B2 * | 11/2004 | Childers et al. | 353/31 |
| 6,962,416 B2 | 11/2005 | Ohara | |
| 7,370,979 B2 * | 5/2008 | Whitehead et al. | 353/85 |
| 7,422,333 B2 | 9/2008 | Ohara | |
| 2006/0023173 A1 | 2/2006 | Mooradian et al. | |
| 2006/0023757 A1 | 2/2006 | Mooradian et al. | |
| 2006/0268241 A1 | 11/2006 | Watson et al. | |
| 2006/0280219 A1 | 12/2006 | Shchegrov | |
| 2006/0290825 A1 | 12/2006 | Onishi et al. | |
| 2007/0013871 A1 * | 1/2007 | Marshall et al. | 353/20 |
| 2007/0153862 A1 | 7/2007 | Shchegrov et al. | |
| 2007/0153866 A1 | 7/2007 | Shchegrov et al. | |

FOREIGN PATENT DOCUMENTS

| | | |
|---|---|---|
| JP | 2003-005714 A | 1/2003 |
| JP | 2004-004284 A | 1/2004 |
| JP | 2007-034263 A | 2/2007 |
| WO | WO2004-109390 | 12/2004 |

OTHER PUBLICATIONS

Aram Mooradian, et al., High Power Extended Vertical Cavity Surface Emitting Diode Lasers and Arrays and Their Applications, Micro-Optics Conference, Nov. 2, 2005, pp. 1-4, Tokyo.

* cited by examiner

*Primary Examiner*—David Hung Vu
(74) *Attorney, Agent, or Firm*—AdvantEdge Law Group, LLC

(57) ABSTRACT

The disclosure is directed to image display apparatus and methods. In one example, an image display apparatus comprises a plurality of light source devices that supply color light components. A spatial light modulation device modulates the color light components from the light source devices according to an image signal. A control unit adjusts a display light emitted from the spatial light modulation device by controlling at least one of the light source devices or the spatial light modulation device. At the time of starting, the control unit adjusts the display light in accordance with an adjustment signal until an amount of light corresponding to at least one of the color light components reaches a predetermined reference value.

18 Claims, 10 Drawing Sheets

IMAGE DISPLAY APPARATUS AND METHOD

CROSS-REFERENCE

The present application claims priority from Japanese Patent Application No. 2007-033118 filed on Feb. 14, 2007, which is hereby incorporated by reference in its entirety.

BACKGROUND

In recent years, a technique of using a laser light source for supplying a laser beam in a light source device of a projector, which is an image display apparatus, has been suggested. As compared with an ultra-high pressure mercury lamp (UHP lamp) that has been used as a light source device of a projector, the light source device that uses a laser light source is advantageous in high color reproducibility, instant lighting, a long life, and the like. For example, a technique of using laser light sources for red (R), green (G), and blue (B) colors is proposed in international patent publication WO 04/109390.

As light source devices that use laser light sources, a light source device that directly supplies a fundamental laser from a laser light source and a light source device that converts the wavelength of a fundamental laser and supplies the converted laser are known. As a wavelength conversion element that converts the wavelength of a fundamental laser, for example, a second-harmonic generation (SHG) element is known. In order to display a bright image, a laser light source having a high output may be used in a projector. While a high output can be obtained by direct emission of a laser light source in the case of R light, typically the SHG elements are used to obtain a high output in the case of G light and B light. By using the SHG element, it becomes possible to supply a laser beam having a desired wavelength using a general-purpose laser light source that is easily available. In addition, a configuration in which a sufficient amount of laser beams can be supplied may also be realized.

In the case of the SHG element, a phase matching condition is not effective when the refractive index distribution changes due to a temperature change, and as a result, the wavelength conversion efficiency decreases. In order to supply a stable amount of laser beams with high efficiency, a temperature control of the SHG element is required. In the case of R light that is directly emitted, a time for temperature control of the SHG element is not necessary. However, G light and B light, which are emitted using the SHG element, cannot be emitted until a time required for temperature control after starting passes. If there is a difference in time required for emitting laser beams having desired wavelengths, it is difficult to obtain an image having suitable color balance until a predetermined time passes from starting of the projector. Display of an image having unsuitable color balance until a predetermined time passes tends to create an unfavorable and unpleasant viewing experience for the viewer.

SUMMARY

In certain embodiments, an image display apparatus includes: a plurality of light source devices that supply different color light components; a spatial light modulation device that modulates the color light components from the light source devices according to an image signal; and a control unit that adjusts display light emitted from the spatial light modulation device by controlling at least either the light source devices or the spatial light modulation device, wherein the control unit adjusts the display light by using an adjustment signal at the time of starting, which is a signal other than the image signal, until the amount of each of the color light components reaches a reference value set for each of the color light components after supply of electric power to the light source devices has started.

Until the amount of each of the color light components reaches the reference value, an image having unsuitable color balance may be displayed even if modulation corresponding to an image signal is performed. Accordingly, it is possible to prevent an image having unsuitable color balance from being displayed by adjusting the display light using an adjustment signal at the time of starting until the amount of light reaches the reference value. In an embodiment in which a plurality of light source devices are used for respective color light components, it is possible to obtain an image display apparatus capable of displaying an image having suitable color balance.

Furthermore, in certain embodiments, the control unit may adjust the display light by control of the spatial light modulation device. This makes it possible to perform adjustment of display light using the adjustment signal at the time of starting.

Furthermore, in certain embodiments, the control unit may adjust the display light by control of the light source devices. This makes it possible to perform adjustment of display light using the adjustment signal at the time of starting.

Furthermore, in certain embodiments, the plurality of light source devices may include a first light source device that supplies a first color light component and a second light source device that supplies a second color light component different from the first color light component. In addition, in a case when the amount of second color light component from the second light source device reaches the reference value after the amount of first color light component from the first light source device has reached the reference value, the control unit performs adjustment for realizing the same gray scale level on a full screen until the amount of second color light component from the second light source device reaches the reference value. Accordingly, it becomes possible not to display an image having unsuitable color balance.

Furthermore, in certain embodiments, the control unit may start display of an image according to the image signal before the amount of second color light component from the second light source device reaches the reference value after supply of electric power to the light source devices has started. The image display according to the image signal can be started at timing at which the second color light component having the amount of light, which does not cause an uncomfortable feeling in color balance of an image checked by visual observation, can be emitted. As a result, an image having color balance that does not cause an uncomfortable feeling can be displayed within a short time after electric power has been supplied to the light source devices.

Furthermore, in certain embodiments, the plurality of light source devices may include a first light source device that supplies a first color light component and a second light source device that supplies a second color light component different from the first color light component. In addition, in a case when the amount of second color light component from the second light source device reaches the reference value after the amount of first color light component from the first light source device has reached the reference value, the control unit may adjust the amount of first color light component from the first light source device according to the amount of second color light component from the second light source device until the amount of second color light component from the second light source device reaches the reference value. Accordingly, it is possible to display an image having suitable color balance until the amount of second color light component from the second light source device reaches the second reference value. In addition, an image having suitable color balance can be displayed after start of the supply of electric power to the light source device.

Furthermore, in certain embodiments, the first light source device may include a light emitting portion that generates light and emits the light from the light emitting portion without converting the wavelength of the light, and the second light source device includes a light emitting portion that generates light and a wavelength conversion element that converts the wavelength of the light from the light emitting portion and emits light whose wavelength has been converted by the wavelength conversion element. In the first light source device and the second light source device, a difference of time required until the amount of light reaches a reference value occurs. Until time required for temperature adjustment of the wavelength conversion element passes, adjustment of the display light is performed by using the adjustment signal at the time of starting. Accordingly, an image having suitable color balance can be displayed by using the first light source device and the second light source device.

Furthermore, in certain embodiments, a measuring unit that measures the amount of each of the color light components from the light source devices may be included. In addition, the control unit may perform adjustments of the display light using the adjustment signal at the time of starting according to a result of measurement made by the measuring unit. Accordingly, the change from adjustment using the adjustment signal at the time of starting to driving according to a normal image signal can be performed.

In addition, in certain embodiments, a control method of an image display apparatus including a plurality of light source devices that supply different color light components and a spatial light modulation device that modulates the color light components from the light source devices according to an image signal includes: supplying different color light components; modulating the color light components according to an image signal; and performing a control for adjusting display light emitted from the spatial light modulation device by controlling at least either the light source devices or the spatial light modulation device. In the performing of the control, the display light is adjusted by using an adjustment signal at the time of starting, which is a signal other than the image signal, until the amount of each of the color light components reaches a reference value set for each of the color light components after supply of electric power to the light source devices has started. Accordingly, in the embodiment in which a plurality of light source devices are used for respective color light components, an image having suitable color balance can be displayed.

BRIEF DESCRIPTION OF THE DRAWINGS

Various embodiments are described with reference to the accompanying drawings, wherein like reference numbers designate like elements.

DESCRIPTION OF EXEMPLARY EMBODIMENTS

Hereinafter, embodiments will be described in detail with reference to the accompanying drawings.

Figure 1:
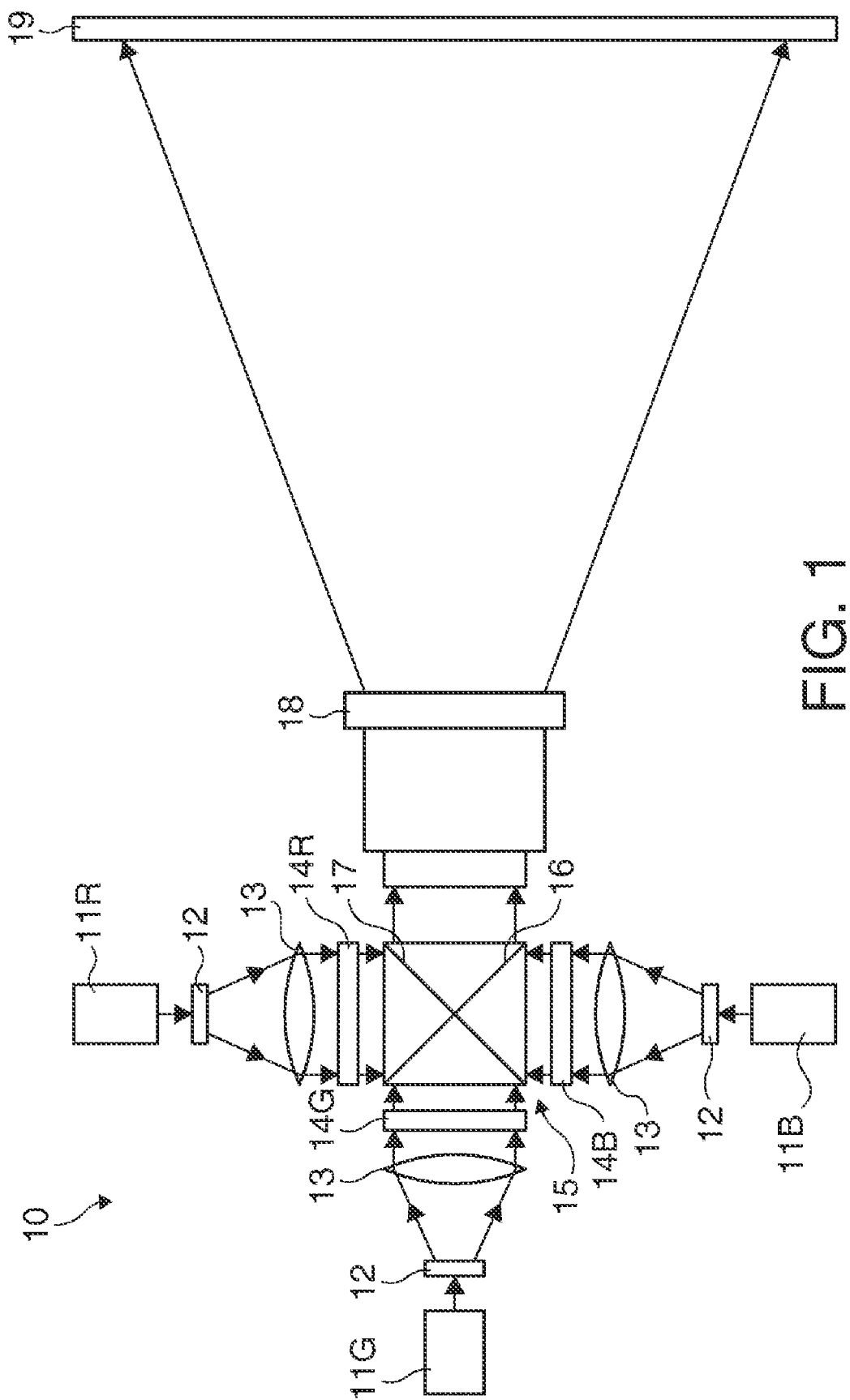
FIG. 1 is a view schematically illustrating the configuration of a projector according to certain embodiments.

FIG. 1 is a view schematically illustrating the configuration of a projector 10 that is an image display apparatus according to an exemplary embodiment. The projector 10 is a front projection type projector that supplies light onto a screen 19 and makes the light reflected from the screen 19 observed such that a viewer enjoys an image. As depicted, the projector 10 has a light source device 11R for red (R) light, a light source device 11G for green (G) light, and a light source device 11B for blue (B) light. The light source device 11R for R light, the light source device 11G for G light, and the light source device 11B for B light supply different color light components. The projector 10 displays an image by using light from each of the light source devices 11R, 11G, and 11B for the respective color light components.

The light source device 11R for R light is a light source device that supplies R light. A diffusing element 12 performs shaping and enlargement of an illuminated region and makes equal the luminous energy distribution of laser beams in the illuminated region. As the diffusing element 12, for example, a computer generated hologram (CGH) that is a diffractive optical element may be used. A field lens 13 causes laser beams from the diffusing element 12 to be collimated and be incident on a spatial light modulation device 14R for R light. The spatial light modulation device 14R for R light is a spatial light modulation device, which modulates R light from the light source device 11R for R light in accordance with an image signal, and is a transmissive liquid crystal display device. The R light modulated by the spatial light modulation device 14R for R light is incident on a cross dichroic prism 15 that is a color composition optical system.

The light source device 11G for G light is a light source device that supplies G light. Laser beams that have passed through the diffusing element 12 and the field lens 13 are incident on a spatial light modulation device 14G for G light. The spatial light modulation device 14G for G light is a spatial light modulation device, which modulates G light from the light source device 11G for G light in accordance with an image signal, and is a transmissive liquid crystal display device. The G light modulated by the spatial light modulation device 14G for G light is incident on the cross dichroic prism 15 from a different side from R light.

The light source device 11B for B light is a light source device that supplies B light. Laser beams that have passed through the diffusing element 12 and the field lens 13 are incident on a spatial light modulation device 14B for B light. The spatial light modulation device 14B for B light is a spatial light modulation device, which modulates B light from the light source device 11B for B light in accordance with an image signal, and is a transmissive liquid crystal display device. The B light modulated by the spatial light modulation device 14B for B light is incident on the cross dichroic prism 15 from a different side from R light and G light. As a transmissive liquid crystal display device, for example, a high temperature polysilicon (HTPS) TFT liquid crystal panel may be used.

The cross dichroic prism 15 has two dichroic films 16 and 17 that are disposed so as to approximately cross each other. The first dichroic film 16 causes R light to be reflected therefrom and G light and B light to be transmitted therethrough. The second dichroic film 17 causes B light to be reflected therefrom and R light and G light to be transmitted therethrough. The cross dichroic prism 15 mixes the R light, the G light, and the B light incident from different directions and then emits the mixed light in the direction of a projection lens 18. The projection lens 18 projects the light mixed by the cross dichroic prism 15 in the direction of the screen 19.

Figure 2:
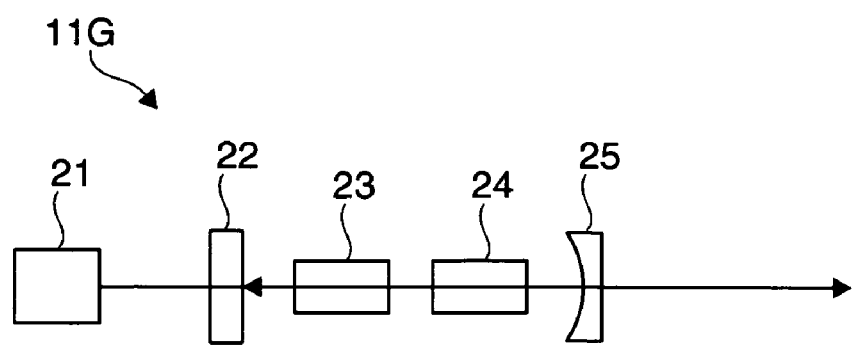
FIG. 2 is a view schematically illustrating one example of a configuration of a light source device for G light.

FIG. 2 is a view schematically illustrating an exemplary configuration of the light source device 11G for G light. The light source device 11G for G light is a diode pumped solid state (DPSS) laser oscillator. The excitation laser 21 is a semiconductor laser that emits a laser beam having a wavelength of 808 nm, for example. The excitation laser 21 may be any of an edge emission type laser and a surface emission type laser. A first resonant mirror 22 is provided at an emission side of the excitation laser 21. A laser beam emitted from the excitation laser 21 is transmitted through the first resonant mirror 22 and is then incident on laser crystal 23. The laser crystal 23 is excited to perform laser oscillation, such that a laser beam having a wavelength of 1064 nm is supplied. As the laser crystal 23, for example, Nd:YVO$_4$ crystal or Nd:YAG (Y$_3$Al$_5$O$_{12}$) crystal may be used. The excitation laser 21 and the laser crystal 23 are light emitting portions that generate fundamental laser.

An SHG element 24 converts a laser beam from the laser crystal 23 into a laser beam having a wavelength of half of that of the laser beam from the laser crystal 23 and emits the converted laser beam. For example, the SHG element 24 converts a laser beam having a wavelength of 1064 nm into a laser beam having a wavelength of 532 nm. As the SHG element 24, non-linear optical crystal may be used, for example. As the non-linear optical crystal, periodically poled lithium niobate (PPLN) of lithium niobate (LiNbO$_3$) may be used, for example.

A second resonant mirror 25 is provided at a side opposite to the laser crystal 23 with respect to the SHG element 24. The second resonant mirror 25 has a function of causing a laser beam having a wavelength of 1064 nm, for example, to be selectively reflected and laser beams having other wavelengths to be transmitted. A laser beam converted to have a specific wavelength, for example, 532 nm, in the SHG element 24 is transmitted through the second resonant mirror 25 to be then emitted from the light source device 11G for G light.

The first resonant mirror 22 has a function of causing a laser beam having a wavelength of 1064 nm, for example, to be selectively reflected and laser beams having other wavelengths to be transmitted, in the same manner as the second resonant mirror 25. The laser beams reflected from the first resonant mirror 22 and the second resonant mirror 25 resonate with a laser beam newly oscillating from the laser crystal 23 to be amplified. Due to the resonator structure, laser beams having a specific wavelength can be emitted with high efficiency. The light source device 11G for G light is not limited to the case of the DPSS laser oscillator. For example, it may be possible to adopt a configuration in which laser beams emitted from a semiconductor laser, which is a light emitting portion, are incident on a wavelength conversion element.

Figure 3:
FIG. 3 is a view illustrating an exemplary block configuration for adjusting the temperature of an SHG element.

FIG. 3 is a view illustrating a block configuration for adjusting the temperature of the SHG element 24. A thermistor 26 outputs a change in temperature, as a change of resistance, to a temperature control portion 27. The temperature control portion 27 calculates the amount of electric power supplied to a heater 28 from a temperature difference between the temperature measured by the thermistor 26 and a set temperature of the SHG element 24 and supplies the electric power corresponding to the calculated amount of electric power to the heater 28. The temperature control portion 27 performs a feedback control of the heater 28 on the basis of a result of the measurement made by the thermistor 26.

The heater 28 adjusts the temperature of the SHG element 24 on the basis of the measurement result of the thermistor 26 by supplying heat according to the electric power controlled by the temperature control portion 27. In the case of the SHG element 24, it is known that a phase matching condition is not valid when the refractive index distribution changes due to a temperature change, and as a result, the wavelength conversion efficiency decreases. It becomes possible to supply a stable amount of laser beams with high efficiency by reducing the temperature change of the SHG element 24. Other configurations may be used for the temperature adjustment of the SHG element 24 without being limited to the case of using the heater 28. For example, the Peltier element may also be used. In the case of using the Peltier element, the temperature of the SHG element 24 may be adjusted by absorbing heat as well as supplying heat.

The light source device 11R for R light shown in FIG. 1 has a semiconductor laser that supplies a laser beam having a wavelength of 640 nm, for example. The light source device 11R for R light is a first light source device that emits a laser beam from a semiconductor laser, which is a light emitting portion, without converting the wavelength and supplies R light that is first color light.

The light source device 11B for B light has a semiconductor laser that is a light emitting portion and an SHG element that is a wavelength conversion element. A semiconductor laser of the light source device 11B for B light supplies a laser beam having a wavelength of 930 nm, for example. The SHG element of the light source device 11B for B light converts a laser beam having a wavelength of, for example, 930 nm into a laser beam having a wavelength of 465 nm. The temperature adjustment of the SHG element of the light source device 11B for B light is made by the same configuration as that shown in FIG. 3. The light source device 11G for G light and the light source device 11B for B light are second light source devices that emit laser beams whose wavelengths have been converted by the wavelength conversion element and supply G light and B light, which are second color light, respectively. In addition, the light source device 11B for B light may be a DPSS laser oscillator.

Figure 4:
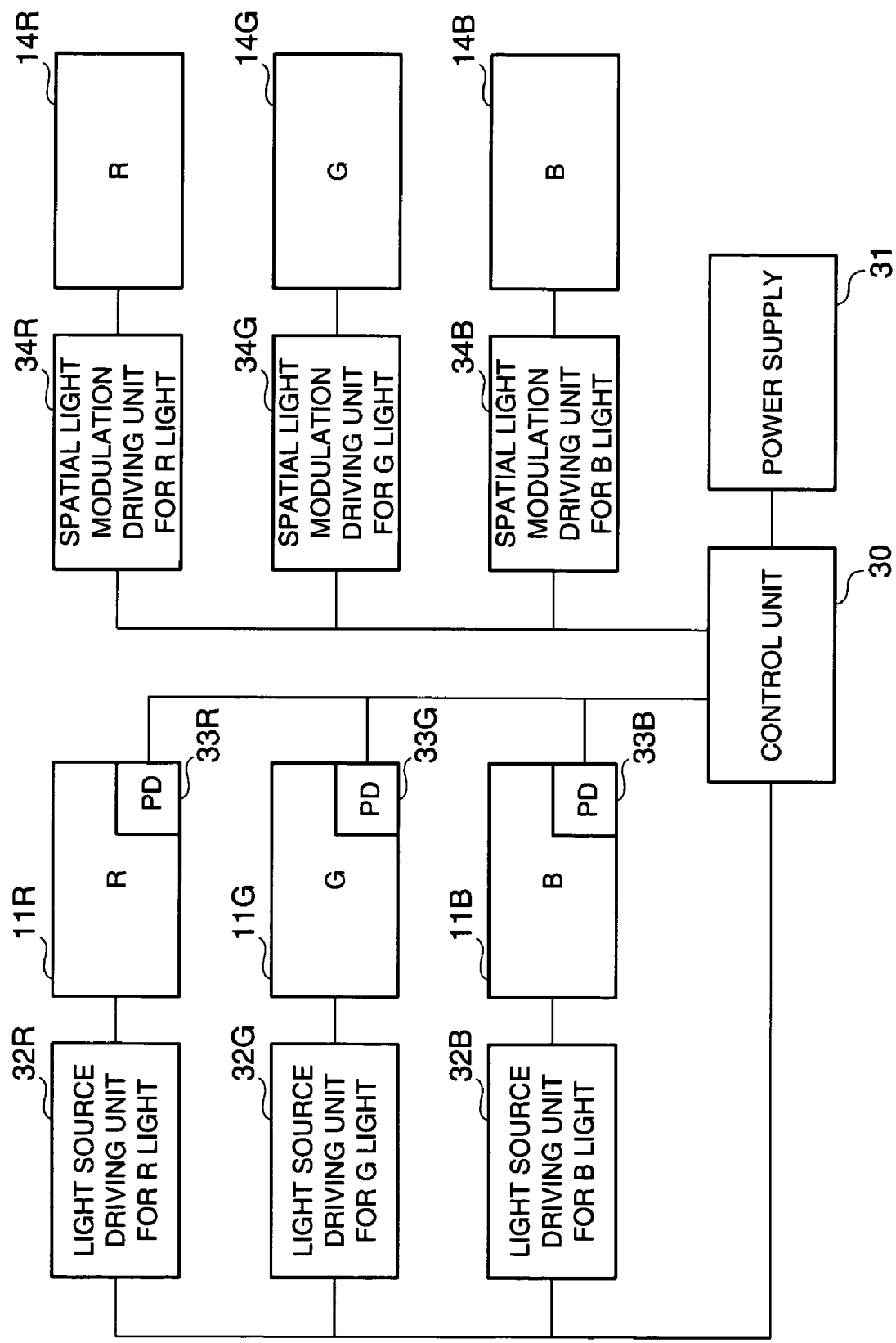
FIG. 4 is a view illustrating an exemplary block configuration for adjusting display light.

FIG. 4 is a view illustrating the block configuration for adjusting display light emitted from each of the spatial light modulation devices 14R, 14G, and 14B for color light components. A power supply 31 is a main power supply of the projector 10. A control unit 30 including a microcomputer and the like controls driving of each of the light source devices 11R, 11G, and 11B for color light components and each of the spatial light modulation devices 14R, 14G, and 14B for color light components. A light source driving unit 32R for R light drives the light source device 11R for R light according to a control of the control unit 30. A light source driving unit 32G for G light drives the light source device 11G for G light according to the control of the control unit 30. A light source driving unit 32B for B light drives the light source device 11B for B light according to the control of the control unit 30. A photodiode (PD) 33R for R light is a measuring unit that measures the amount of R light emitted from the light source device 11R for R light. A PD 33G for G light is a measuring unit that measures the amount of G light emitted from the light source device 11G for G light. A PD 33B for B light is a measuring unit that measures the amount of B light emitted from the light source device 11B for B light.

Image signals from external apparatuses, such as a computer, a DVD player, and a TV tuner, are input to an image signal processor (not shown) of the control unit 30. The image signal processor performs resizing, gamma adjustment, and color adjustment of an image by characteristic correction and amplification of an image signal, for example. In addition, the image signal processor decomposes an image signal into image data corresponding to R, G, and B. A spatial light modulation signal generator (not shown) of the control unit 30 generates a spatial light modulation signal for driving each of the spatial light modulation devices 14R, 14G, and 14B for color light components on the basis of image data from the image signal processor. The spatial light modulation driving unit 34R for R light drives the spatial light modulation device 14R for R light according to the spatial light modulation signal for R light. The spatial light modulation driving unit 34G for G light drives the spatial light modulation device 14G for G light according to the spatial light modulation signal for G light. The spatial light modulation driving unit 34B for B light drives the spatial light modulation device 14B for B light according to the spatial light modulation signal for B light.

In order to obtain an image having suitable color balance by modulation of each of the color light components corresponding to an image signal, the color light components need to be supplied in a predetermined light amount ratio. Since a set temperature of the SHG element 24 (refer to FIG. 3) is typically higher than an environmental temperature, it takes at least several seconds until the SHG element 24 reaches the set temperature after driving of the heater 28 has started. For this reason, it takes several seconds for the light source device 11G for G light and the light source device 11B for B lights to emit laser beams satisfying the predetermined light amount ratio after the power supply 31 has been turned on. On the other hand, since the light source device 11R for R light performs direct emission without using the SHG element 24, the light source device 11R for R light can emit laser beams satisfying the predetermined light amount ratio within several nanoseconds.

When display light corresponding to an image signal is emitted at the moment the power supply 31 is turned on, the intensity of R light is large compared with those of G and B light. As a result, an image having unsuitable color balance may be displayed. Even if a predetermined time is taken until the SHG element 24 reaches the set temperature, a viewer may have an unpleasant viewing experience due to the display of an image having unsuitable color balance.

Figure 5:
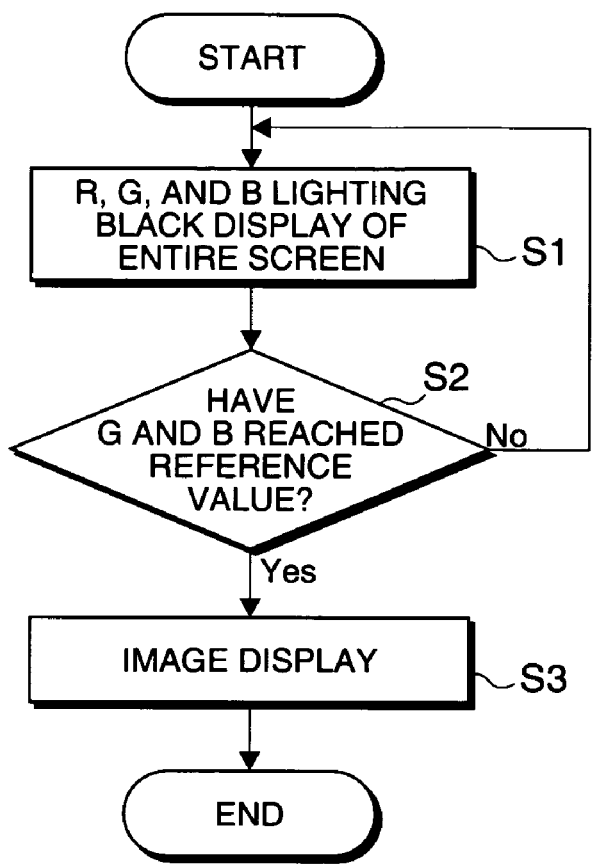
FIG. 5 is a flow chart depicting an exemplary control process for adjusting display light.

FIG. 5 is a flow chart illustrating a control process for adjusting display light by using the configuration shown in FIG. 4. In step S1, the light source devices 11R, 11G, and 11B for color light components are lighted by turning on the power supply 31. In addition, driving of the heater 28 (refer to FIG. 3) provided in the light source device 11G for G light and the light source device 11B for B light is started by turning on the power supply 31. In addition, the control unit 30 performs adjustment of display light for displaying the entire screen in black. Such black display can be obtained by causing each display light corresponding to R, G, and B to have a minimum gray scale level on a full screen, through a control of each of the spatial light modulation devices 14R, 14G, and 14B for color light components using an adjustment signal at the time of the starting, which is a signal other than an image signal. Thus, the control unit 30 performs adjustment for realizing a minimum gray scale level, which is the same gray scale level, on the full screen. In step S1, display light emitted from the spatial light modulation devices 14R, 14G, and 14B for color light components is adjusted by the control of the spatial light modulation devices 14R, 14G, and 14B for color light components.

In step S2, it is determined whether or not the amount of G light emitted from the light source device 11G for G light and the amount of B light emitted from the light source device 11B for B light have reached a reference value. The reference value is a value corresponding to the amount of light satisfying a light amount ratio, which allows an image having suitable color balance to be obtained, and is set for every color light component. The control unit 30 makes a determination according to results of measurements made by the PD 33G for G light and the PD 33B for B light. The control unit 30 adjusts the display light using an adjustment signal at the time of starting, according to the results of measurements made by the PD 33G for G light and the PD 33B for B light.

If it is determined that the amount of G light and the amount of B light have not reached the reference value in step S2, the process returns to step S1 in which lighting of the light source devices 11R, 11G, and 11B for color light components and black display are continued. If it is determined that the amount of G light and the amount of B light have reached the reference value in step S2, image display is started in step S3. Step S3 is a light supplying process for supplying different color light components and a modulation process for modulating color light according to an image signal. The image display is started by change from the adjustment using the adjustment signal at the time of starting to driving of the spatial light modulation devices 14R, 14G, and 14B for color light components according to normal image signals.

Figure 6:
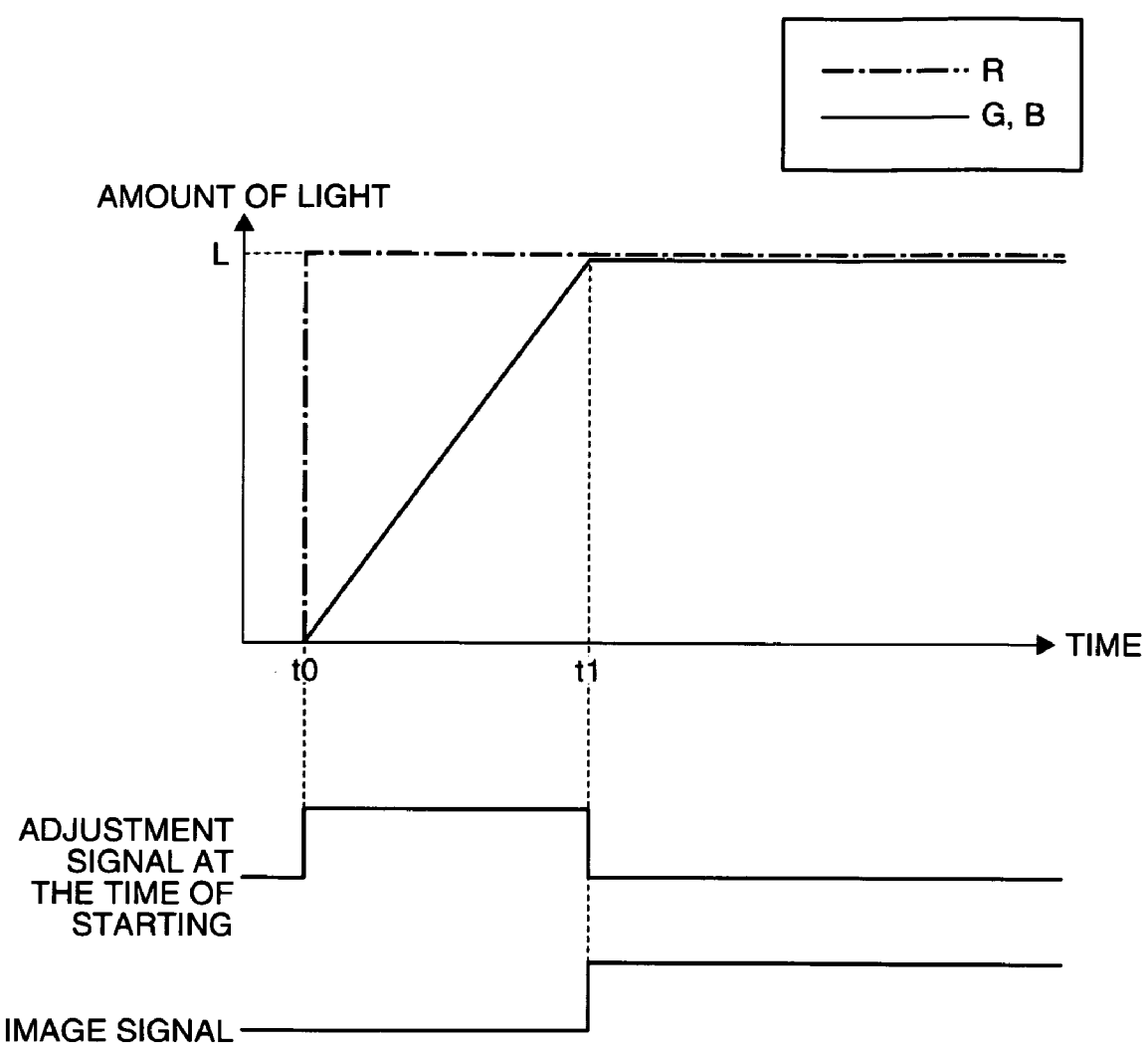
FIG. 6 is a view depicting the relationship between the amount of each color light component and time.

FIG. 6 is a view explaining a relationship between time and the amount of light, which is emitted from each of the light source devices 11R, 11G, and 11B for color light components, and an output period of an adjustment signal at the time of starting and an output period of an image signal. In addition, even though the same value L is herein set as a reference value for respective color components, the absolute amount of the reference value L is set differently for the respective color light components. The amount of R light emitted from the light source device 11R for R light reaches the reference value L immediately after time t0 at which the power supply 31 has been turned on. In contrast, the amount of G light emitted from the light source device 11G for G light and the amount of B light emitted from the light source device 11B for B light increase as time passes from time t0 and reach the reference value L at time t1. Thus, the amount of G and B light, which is the second color light, reaches the reference value after the amount of R light that is the first color light has reached the reference value L.

During a period from time t0 to time t1, the control unit 30 stops an output of an image signal and outputs an adjustment signal at the time of starting. The control unit 30 performs adjustment for realizing a minimum gray scale level on a full screen until both the amount of G light emitted from the light source device 11G for G light and the amount of B light emitted from the light source device 11B for B light reach the reference value L. Thus, the control unit 30 adjusts display light by using the adjustment signal at the time of starting until the amount of light corresponding to each color reaches the reference value L after supply of electric power to each of the light source devices 11R, 11G, and 11B for color light components is started.

Furthermore, the control unit 30 stops an output of an adjustment signal at the time of starting and starts an output of an image signal at time t1. The control unit 30 causes an image corresponding to an image signal to be displayed after both the amount of G light and the amount of B light have reached the reference value L. By adjusting the display light on the basis of results of measurements made by the PD 33G for G light and the PD 33B for B light that are measuring units, the change from adjustment using the adjustment signal at the time of starting to driving according to a normal image signal can be performed at appropriate timing. In addition, the PDs 33R, 33G, and 33B for color light components can be used for the feedback control of the light source devices 11R, 11G, and 11B for color light components while an image is being displayed.

Until the amount of each color light component reaches the reference value L, an image having unsuitable color balance may be displayed even if modulation corresponding to an image signal is performed. It is possible to cause the image having unsuitable color balance not to be displayed by adjusting display light using an adjustment signal at the time of starting until the amount of light reaches the reference value L. Thus, an image having suitable color balance can be displayed in the configuration in which a plurality of light source devices are used for respective color light components. This is suitable for a case in which, for example, an image is displayed by using a laser beam emitted from the first light source device, in which a wavelength conversion element is not used, and a laser beam emitted from the second light source device, in which the wavelength conversion element is used.

Figure 7:
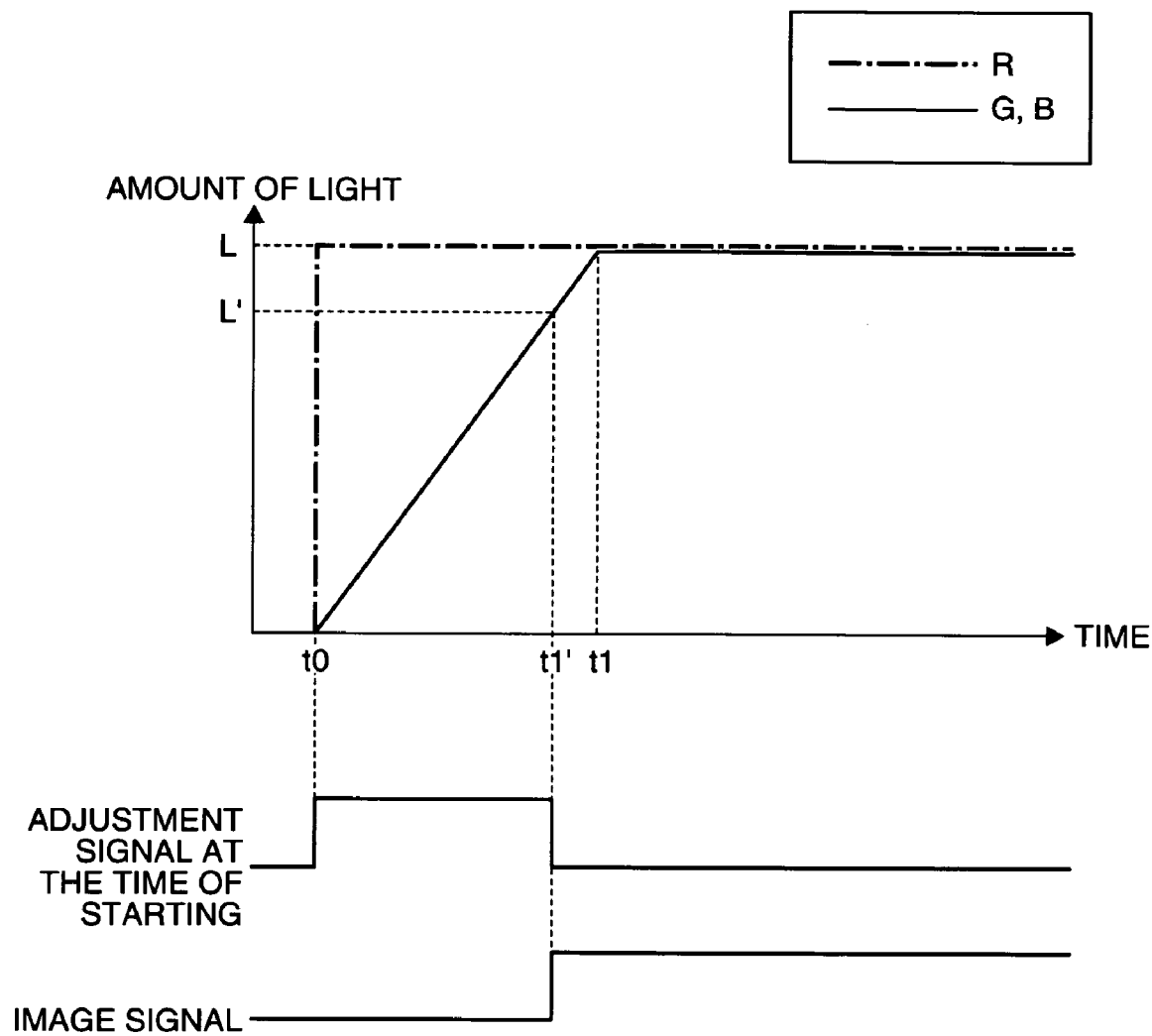
FIG. 7 is a view depicting other modes of an output period of an adjustment signal at the time of starting and an image signal.

FIG. 7 is a view explaining other modes of an output period of the adjustment signal at the time of starting and the image signal. A predetermined value L' is the amount of light that does not cause an uncomfortable feeling in color balance of an image checked by visual observation. For example, the predetermined value L' is a value equivalent to 80% of the reference value L. The amount of G light emitted from the light source device 11G for G light and the amount of B light emitted from the light source device 11B for B light reach the predetermined value L' at time t1' before time t1.

During a period from time t0 to time t1', the control unit 30 stops an output of an image signal and outputs an adjustment signal at the time of starting. The control unit 30 performs adjustment for realizing a minimum grayscale level on a full screen until both the amount of G light emitted from the light source device 11G for G light and the amount of B light emitted from the light source device 11B for B light reach the reference value L'. Furthermore, the control unit 30 stops an output of an adjustment signal at the time of starting and starts an output of an image signal at time t1'. Thus, the control unit 30 starts the image display corresponding to an image signal before both the amount of G light and the amount of B light reach the reference value L. As a result, an image having color balance that does not cause an uncomfortable feeling can be displayed within a short time after electric power has been supplied to the light source devices 11R, 11G, and 11B for color light components. As another example, the predetermined value L' of the amount of each of the G light and the B light when the image display is started is not limited to the case in which the predetermined value L' is equivalent to 80% of the reference value L, but may be properly set. In this case, the color balance of an image checked by visual observation may not cause an uncomfortable feeling.

The present embodiment is not limited to the case in which the control unit 30 adjusts the display light using the adjustment signal at the time of starting, according to results of measurements made by the PDs 33R, 33G, and 33B for the respective color light components that are measuring units. For example, a time until the amount of light reaches the reference value L after a power supply is turned on may be calculated beforehand and the adjustment of display light may be performed using the adjustment signal at the time of starting until the calculated time passes. Alternatively, the adjustment of display light may also be performed according to a result of measurement made by the thermistor 26 (refer to FIG. 3). In this case, it is possible to adjust the display light using the adjustment signal at the time of starting until the SHG element 24 reaches the set temperature.

Each of the light source devices 11R, 11G, and 11B for color light components is not limited to the configuration using a semiconductor laser. For example, each of the light source devices 11R, 11G, and 11B for color light components may have a configuration using a solid-state laser, a liquid laser, a gas laser, and the like. In addition, each of the light source devices 11R, 11G, and 11B for color light components may be a light source other than the laser light source. For example, each of the light source devices 11R, 11G, and 11B for color light components may have a configuration using an LED or an organic EL by which a light source can be applied for every light component.

Figure 8:
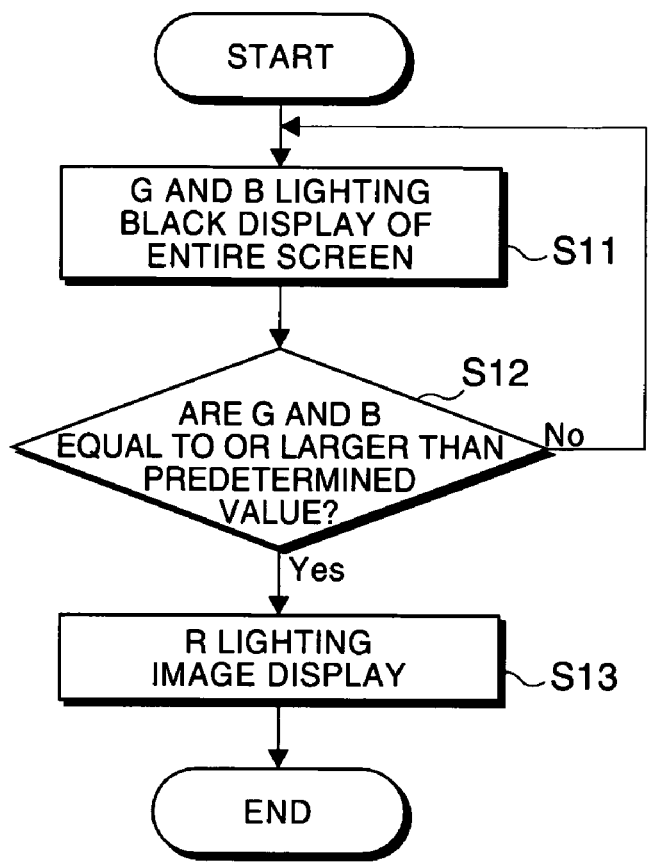
FIG. 8 is a flow chart illustrating another embodiment of a control process for adjusting display light.

FIG. 8 is a flow chart illustrating another embodiment. This embodiment is characterized in that the display light is adjusted by controlling a spatial light modulation device and a light source device using an adjustment signal at the time of starting. In step S11, only the light source device 11G for G light and the light source device 11B for B light are lighted. The control unit 30 causes only the light source device 11G for G light and the light source device 11B for B light to be lighted by means of control using the adjustment signal at the time of starting. In addition, adjustment of display light for displaying the entire screen in black is performed by control of the spatial light modulation device 14G for G light and the spatial light modulation device 14B for B light using the adjustment signal at the time of starting.

In step S12, it is determined whether or not the amount of G light emitted from the light source device 11G for G light and the amount of B light emitted from the light source device 11B for B light have reached the above-described reference value. If it is determined that the amount of G light and the amount of B light have not reached the reference value in step S12, the process returns to step S11 in which lighting of the light source device 11G for G light and the light source device 11B for B light and black display are continued. If it is determined that the amount of G light and the amount of B light have reached the reference value in step S12, the light source device 11R for R light is lighted and image display is started in step S13. The lighting of the light source device 11R for R light and the image display are started by change from the adjustment using the adjustment signal at the time of starting to driving of the light source devices 11R, 11G, and 11B for color light components and the spatial light modulation devices 14R, 14G, and 14B for color light components according to normal image signals.

Figure 9:
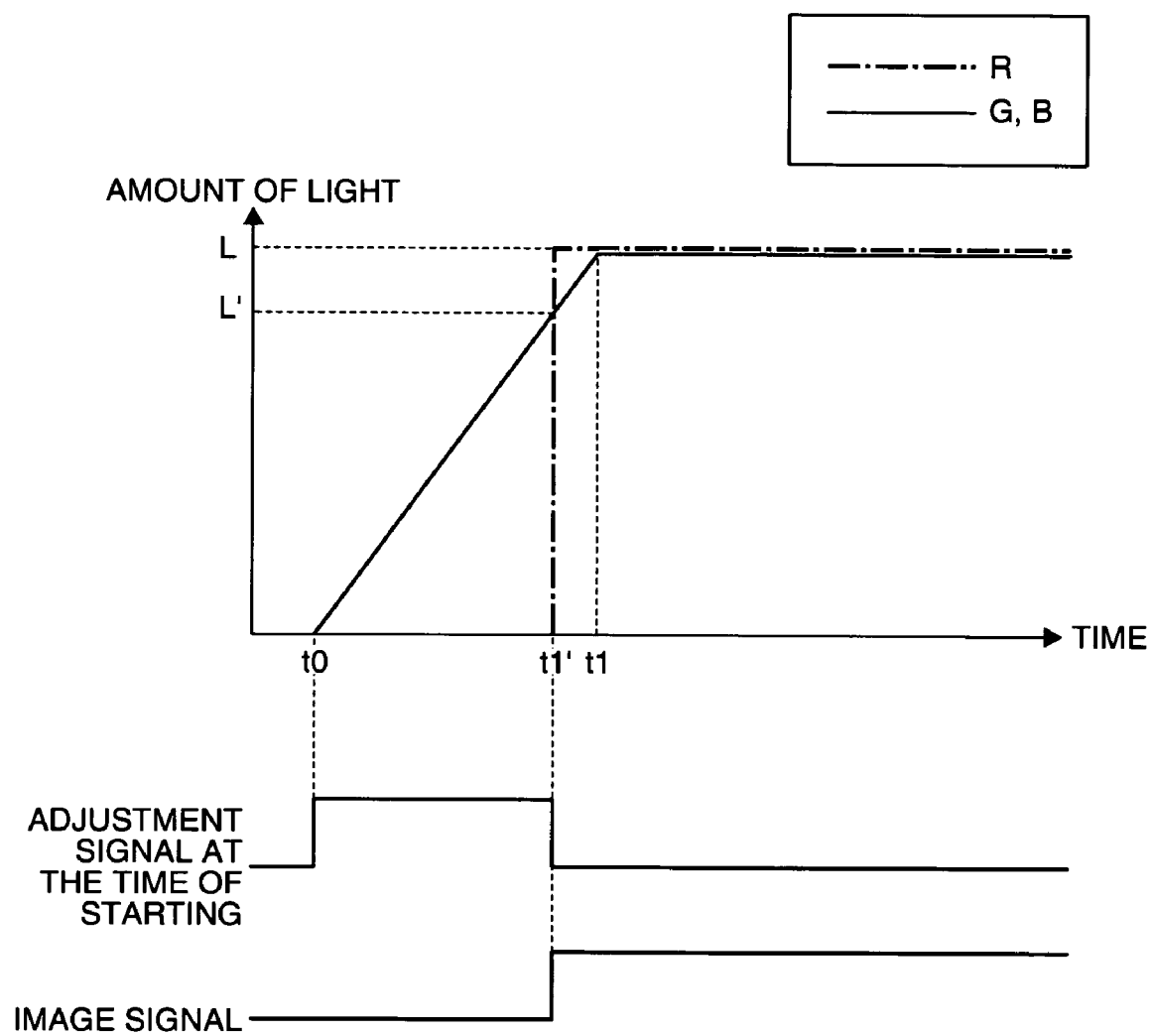
FIG. 9 is a view depicting the relationship between the amount of each color light component and time.

FIG. 9 is a view explaining a relationship between time and the amount of light, which is emitted from each of the light source devices 11R, 11G, and 11B for color light components, and an output period of an adjustment signal at the time of starting and an output period of an image signal. The amount of G light emitted from the light source device 11G for G light and the amount of B light emitted from the light source device 11B for B light reach the predetermined value L' at time t1' and the reference value L at time t1. During a period from t0 to t1', the control unit 30 causes only the light source device 11G for G light and the light source device 11B for B light to be lighted by means of the adjustment signal at the time of starting and black display to be displayed.

At time t1', the control unit 30 starts driving of the light source device 11R for R light using an image signal and normal image display. The amount of R light emitted from the light source device 11R for R light reaches the reference value L immediately after time t1'. Even in this embodiment, an image having suitable color balance can be displayed all the time. In addition, the power consumption can be reduced by stopping driving of the light source device 11R for R light during the period from t0 to t1'. In addition, the adjustment signal at the time of starting may be changed to an image signal at time t1 at which the amount of G light and the amount of B light reach the reference value L.

Figure 10:
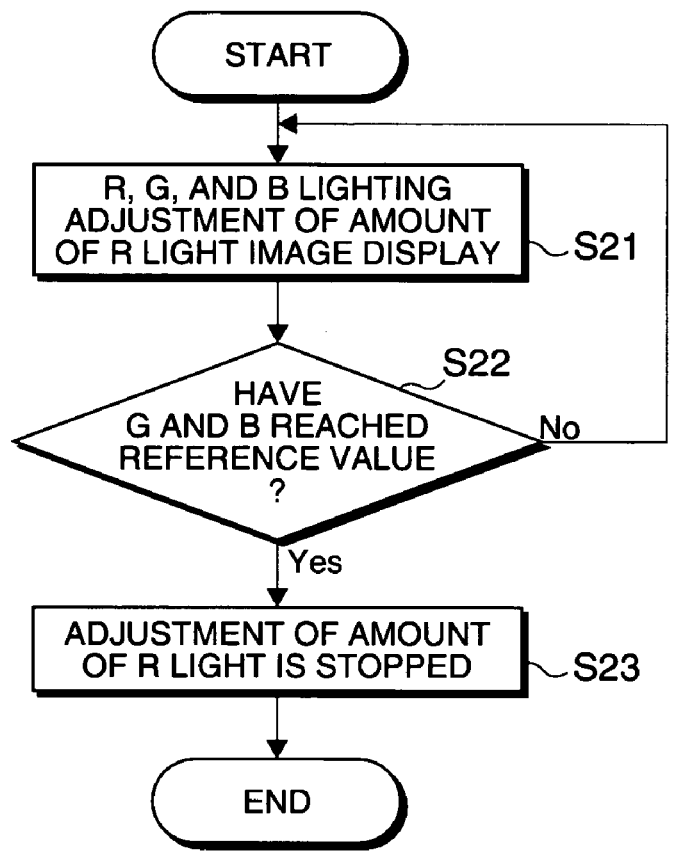
FIG. 10 is a flow chart illustrating another embodiment of a control process for adjusting display light.

FIG. 10 is a flowchart explaining another embodiment. This embodiment is characterized in that the display light is adjusted by controlling a light source device using an adjustment signal at the time of starting. In step S21, the light source devices 11R, 11G, and 11B for color light components are lighted. In addition, the control unit 30 adjusts the amount of R light, which is the first color light, according to the amount of G and B light, which is the second color light, using the adjustment signal at the time of starting. The adjustment of the amount of R light according to the amount of G and B light can be performed by controlling the light source device 11R for R light on the basis of results of measurements made by the PDs 33R, 33G, and 33B for color light components. Moreover, the control unit 30 causes an image corresponding to an image signal to be displayed.

In step S22, it is determined whether or not the amount of G light emitted from the light source device 11G for G light and the amount of B light emitted from the light source device 11B for B light have reached a reference value. If it is determined that the amount of G light and the amount of B light have not reached the reference value in step S22, the process returns to step S21 in which lighting of the light source devices 11R, 11G, and 11B for color light components, adjustment of the amount of R light, and image display are continued. If it is determined that the amount of G light and the amount of B light have reached the reference value in step S22, the adjustment of the amount of R light is stopped in step S23. The stopping of adjustment of the amount of R light can be performed by stopping an output of an adjustment signal at the time of starting.

Figure 11:
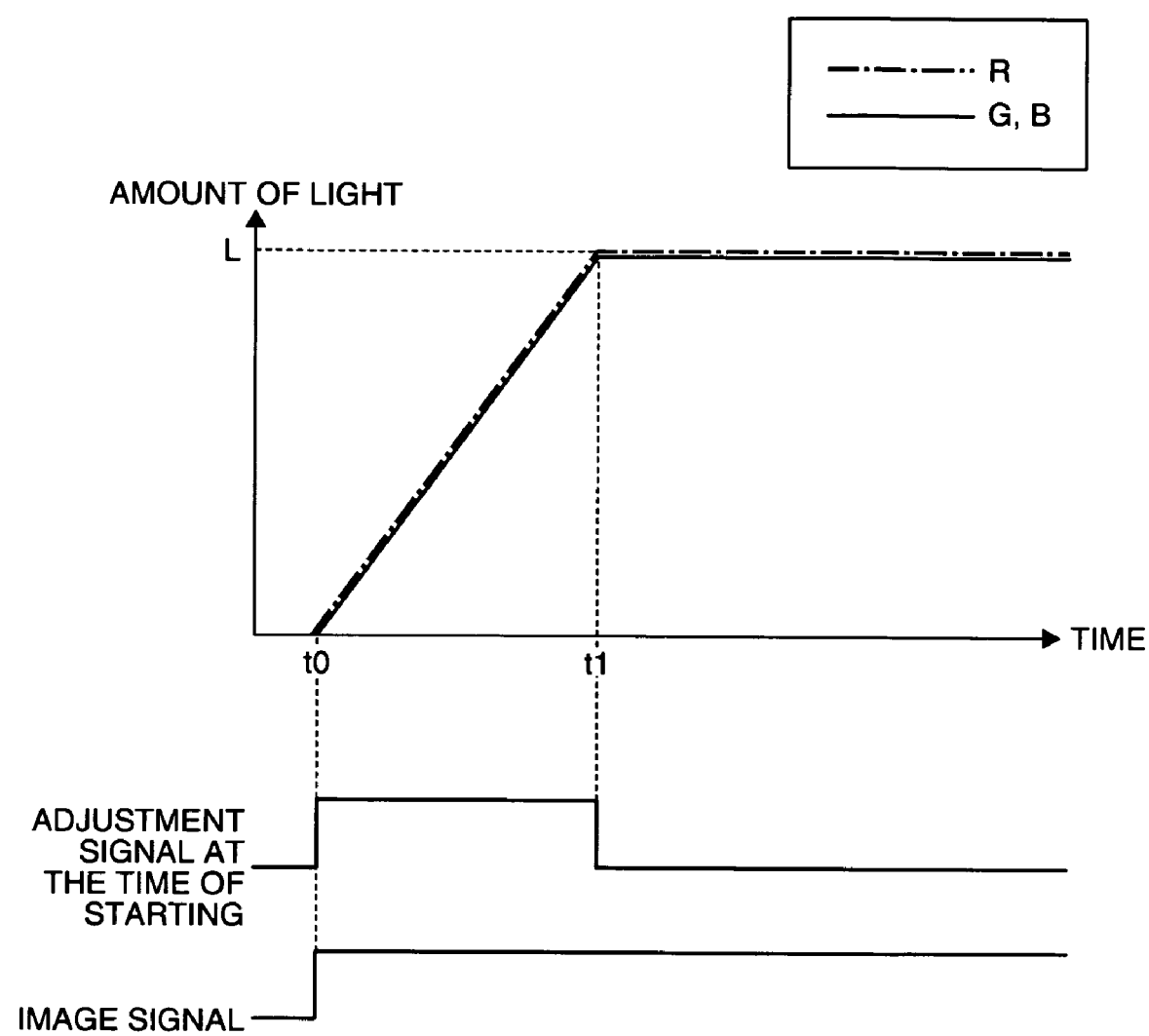
FIG. 11 is a view depicting the relationship between the amount of each color light component and time.

FIG. 11 is a view explaining a relationship between time and the amount of light, which is emitted from each of the light source devices 11R, 11G, and 11B for color light components, and an output period of an adjustment signal at the time of starting and an output period of an image signal. The amount of R light emitted from the light source device 11R for R light increases as time passes from time t0 and reaches the reference value L at time the, in the same manner as the G and B light. The control unit 30 starts the output of an image signal at time t0. In addition, during a period from t0 to t1, the control unit 30 adjusts the amount of R light emitted from the light source device 11R for R light using the adjustment signal at the time of starting. Thus, the control unit 30 adjusts the amount of R light, which is the first color light, according to the amount of G and B light, which is the second color light, until the amount of G and B light reaches the reference value L. Due to the adjustment of the amount of R light, an image during the period from t0 to t1 is displayed with suitable color balance even though the image has low brightness compared with an image after time t1.

By adjusting the amount of R light, it becomes possible to display an image having suitable color balance even during the period from t0 to t1. Accordingly, even in this embodiment, an image having suitable color balance can be displayed. In addition, the image having suitable color balance can be displayed upon turning on of the power supply 31.

The projector 10 that is an image display apparatus according to certain embodiments is not limited to the case in which a transmissive liquid crystal display device is used as a spatial light modulation device. For example, an LCOS (liquid crystal on silicon), a DMD (digital micromirror device), and a GLV (grating light valve) that are reflective liquid crystal display devices may be used as the spatial light modulation device. The projector 10 is not limited to the configuration in which the spatial light modulation device is provided for every color light component. Also, the projector 10 may have a configuration in which two or three or more color light components are modulated by one spatial light modulation device.

Furthermore, the projector 10 is not limited to the configuration in which the three light source devices 11R, 11G, and 11B corresponding to R, G, and B are used. The projector 10 may have a configuration in which four or more light source devices are used. In addition, the image display apparatus according to certain embodiments may be a so-called rear projector that supplies light onto a surface of a screen and makes light emitted from the other surface of the screen observed such that a viewer enjoys an image.

As described above, the light source device according to certain embodiments may be used for a projector.

The preceding is merely a description of several embodiments. While specific embodiments and applications have been illustrated and described, it is to be understood that the precise configuration and components disclosed herein is illustrative only and not limiting in any sense. Having the benefit of this disclosure, various modifications, changes, and variations will be apparent to those of ordinary skill in the art without departing from the spirit and scope of the principles disclosed. Thus, to the maximum extent allowed by law, the scope of the invention is to be determined by the broadest permissible interpretation of the following claims and their equivalents, and shall not be restricted or limited by the foregoing description.

What is claimed is:

1. An image display apparatus comprising:
   a plurality of light source devices that supply color light components;
   a spatial light modulation device that modulates the color light components from the light source devices according to an image signal; and
   a control unit that adjusts a display light emitted from the spatial light modulation device by controlling at least one of the light source devices or the spatial light modulation device,
   wherein, at the time of starting, the control unit adjusts the display light in accordance with an adjustment signal until an amount of light corresponding to at least one of the color light components reaches a predetermined reference value.

2. The image display apparatus according to claim 1, wherein the control unit adjusts the display light by controlling the spatial light modulation device.

3. The image display apparatus according to claim 1, wherein the control unit adjusts the display light by controlling at least one of the light source devices.

4. The image display apparatus according to claim 1,
wherein the plurality of light source devices further comprise a first light source device that supplies a first color light component and a second light source device that supplies a second color light component, the second color light component being different from the first color light component, and
wherein, when the amount of light of the first color light component reaches the reference value before the amount of light of the second color light component reaches the reference value, the control unit adjusts the display light so as to realize a same gray scale level on a full screen until the amount of light of the second color light component reaches the reference value.

5. The image display apparatus according to claim 4,
wherein the control unit starts a display of an image in accordance with the image signal prior to the amount of light of the second color light component reaching the reference value.

6. The image display apparatus according to claim 4,
wherein the first light source device further comprises a light emitting portion that generates light and emits the light from the light emitting portion without converting a wavelength of the light, and
wherein the second light source device further comprises a light emitting portion and a wavelength conversion element, the light emitting portion generating light and the wavelength conversion element converting a wavelength of the light.

7. The image display apparatus according to claim 1,
wherein the plurality of light source devices further comprise a first light source device that supplies a first color light component and a second light source device that supplies a second color light component, the second color light component being different from the first color light component, and
wherein the control unit adjusts the amount of light of the first color light component according to the amount of light of the second color light component until the amount of light of the second color light component reaches the reference value.

8. The image display apparatus according to claim 1, further comprising:
a measuring unit that measures the amount of light of each of the color light components from the light source devices, and
wherein the control unit adjusts the display light using the adjustment signal in accordance with a measurement made by the measuring unit.

9. The image display apparatus according to claim 8, wherein the measuring unit is a photodiode.

10. The image display apparatus according to claim 1,
wherein the plurality of light source devices further comprise a first light source device that supplies a first color light component and a second light source device that supplies a second color light component, the second color light component being different from the first color light component, and
wherein the control unit adjusts the display light so as to realize a same gray scale level on a screen until an amount of light of the second color light component reaches the reference value.

11. The image display apparatus according to claim 1,
wherein the plurality of light source devices further comprise a first light source device that supplies a first color light component and a second light source device that supplies a second color light component, the second color light component being different from the first color light component;
further wherein the control unit adjusts the display light by controlling the spatial light modulation device for the first and second color light components in accordance with the adjustment signal; and
further wherein, when the amount of light corresponding to the second color light component reaches the reference value, the control unit begins adjusting the display light by controlling the spatial light modulation device in accordance with the image signal.

12. The image display apparatus according to claim 11, wherein the first light source device supplies a red light component and the second light source device supplies either a green light component or a blue light component.

13. The image display apparatus according to claim 11, wherein the second light source device includes a wavelength conversion element for converting a wavelength of the light emitted from the second light source device, and the first light source device does not include a wavelength conversion element.

14. The image display apparatus according to claim 1,
wherein the plurality of light source devices further comprise a first light source device that supplies a first color light component and a second light source device that supplies a second color light component, the second color light component being different from the first color light component, and
wherein, at the time of starting, the control unit
does not turn on the first light source device, and
adjusts the display light by controlling the spatial light modulation device for the second color light component in accordance with the adjustment signal, and
when the amount of light corresponding to the second color light component reaches the reference value, the control unit then turns on the first light source device and begins adjusting the display light by controlling the spatial light modulation device for the first and second color light components in accordance with the image signal.

15. The image display apparatus of claim 1,
wherein the plurality of light source devices further comprise a first light source device that supplies a first color light component and a second light source device that supplies a second color light component, the second color light component being different from the first color light component; and
wherein the control unit
adjusts the amount of light of the first color light component by controlling the first light source device with the adjustment signal, and
does not adjust the amount of light of the second color light component; and
whereupon, when the amount of light corresponding to the second color light component reaches the reference value, the control unit begins adjusting the display light by controlling the spatial light modulation device in accordance with the image signal.

16. The image display apparatus according to claim 1, wherein the plurality of light source devices comprise a light source device that supplies a red light component, a light source device that supplies a green light component, and a light source device that supplies a blue light component.

17. An image display apparatus comprising:
a plurality of light source devices that supply color light components;

a spatial light modulation device that modulates the color light components from the light source devices according to an image signal; and a control unit that adjusts a display light emitted from the spatial light modulation device by controlling at least one of the light source devices or the spatial light modulation device, and wherein, upon initially supplying power to the light source devices, the control unit adjusts the display light in accordance with an adjustment signal until an amount of light corresponding to at least one of the color light components reaches a predetermined reference value, at which point, the control unit then begins adjusting the display light in accordance with the image signal.

18. A control method of an image display apparatus, comprising:

providing different color light components from a plurality of light source devices;

modulating the color light components using a spatial light modulation device in accordance with an image signal; and adjusting a display light emitted from the spatial light modulation device by controlling at least either one of the light source devices or the spatial light modulation device, wherein, at the time of starting, the display light is adjusted by using an adjustment signal until an amount of light corresponding to at least one of the color light components reaches a predetermined reference value.

* * * * *